(12) United States Patent
Maynard et al.

(10) Patent No.: US 6,674,182 B2
(45) Date of Patent: Jan. 6, 2004

(54) EMERGENCY VEHICLE WIRING HARNESS AND CONTROL SYSTEM

(75) Inventors: Lyman B. Maynard, Oakville (CA); Tom Forsythe, Mississauga (CA)

(73) Assignee: Mannesmann VDO AG, Frankfurt am Main (DE)

( * ) Notice: Subject to any disclaimer, the term of this patent is extended or adjusted under 35 U.S.C. 154(b) by 160 days.

(21) Appl. No.: 09/920,096

(22) Filed: Aug. 1, 2001

(65) Prior Publication Data

US 2002/0017796 A1 Feb. 14, 2002

Related U.S. Application Data

(63) Continuation-in-part of application No. 09/756,557, filed on Jan. 6, 2001.
(60) Provisional application No. 60/174,754, filed on Jan. 6, 2000.

(51) Int. Cl.[7] .................................................. H02G 3/00
(52) U.S. Cl. ..................... 307/10.8; 307/10.1; 307/91.1
(58) Field of Search ................................ 307/10.1, 9.1, 307/10.8

(56) References Cited

U.S. PATENT DOCUMENTS

| | | | |
|---|---|---|---|
| 3,569,788 A | 3/1971 | Niblack | |
| 5,179,503 A | 1/1993 | Fouts et al. | |
| 5,345,218 A | 9/1994 | Woods et al. | |
| 5,434,553 A | 7/1995 | Rhodes | |
| 5,499,009 A | 3/1996 | Davis | |
| 5,511,842 A | 4/1996 | Dillon | |
| 5,585,782 A | 12/1996 | Yosko | |
| 5,625,257 A | 4/1997 | Nunn | |
| 5,644,290 A | 7/1997 | Rhodes | |
| 5,659,289 A | 8/1997 | Zonkoski et al. | |
| 5,703,411 A | * 12/1997 | Bella et al. | ................ 307/10.1 |
| 5,770,999 A | 6/1998 | Rhodes | |
| 5,912,511 A | 6/1999 | Hidaka | |
| 5,949,148 A | 9/1999 | Wagner | |
| 5,971,799 A | 10/1999 | Swade | |
| 6,005,300 A | 12/1999 | Kelly | |
| 6,018,201 A | 1/2000 | Mauney et al. | |
| 6,142,556 A | 11/2000 | Tanaka et al. | |
| 6,166,453 A | 12/2000 | Kon'i et al. | |

* cited by examiner

Primary Examiner—Gregory J. Toatley, Jr.
Assistant Examiner—Robert L DeBeradinis
(74) Attorney, Agent, or Firm—Cohen, Pontani, Lieberman & Pavane

(57) ABSTRACT

A wiring harness for use with an emergency vehicle. The wiring harness can be an independent wiring harness added after the vehicle has been manufactured or it can be included in the original equipment manufacturer's wiring harness. The wiring harness permits the addition of emergency vehicle equipment, such as two-way radios, computers, radar guns, etc., without splicing into the original equipment manufacturer's wiring.

32 Claims, 20 Drawing Sheets

FIG. 11
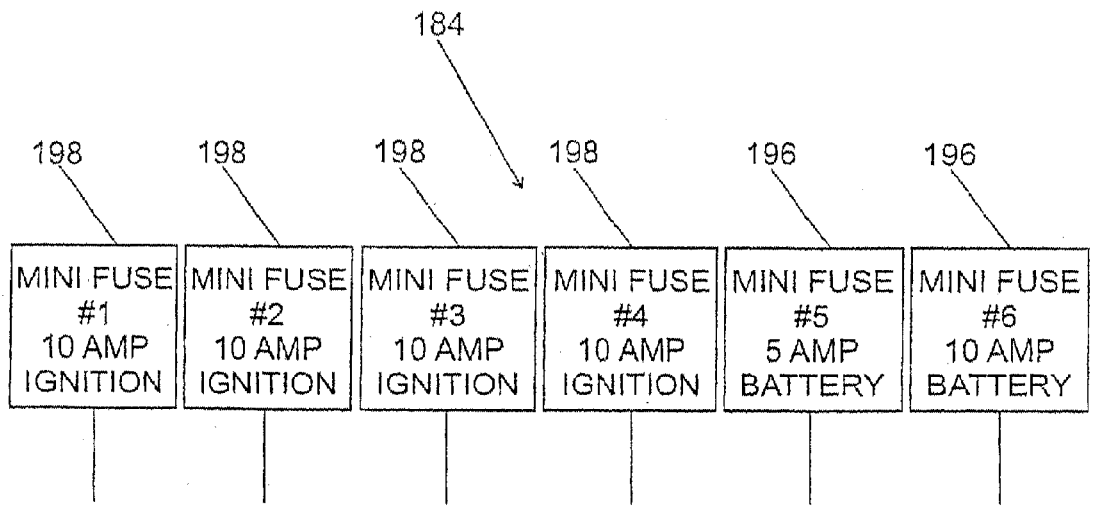
USED WITH
VISIBILITY
PACKAGE
OPTION
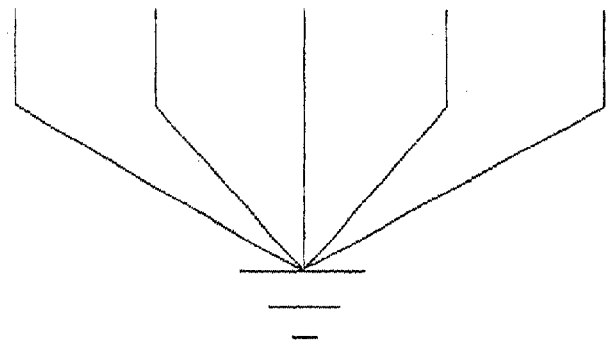
GROUND
SOURCE AT
GLOVE BOX
FUSE / RELAY
BLOCK
USE GROUND(S) PROVIDED, ONE WITH EACH POWER SOURCE FIG. 16
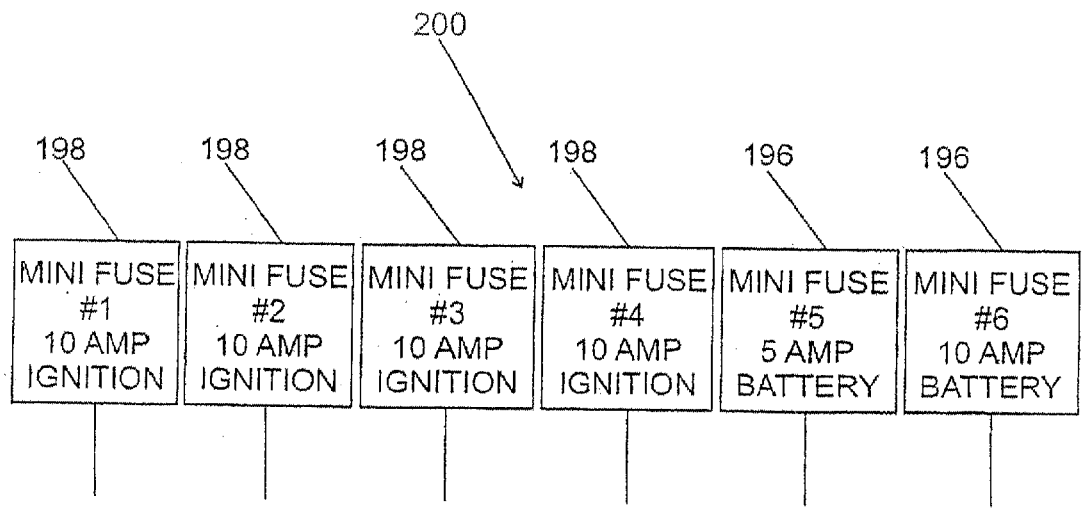
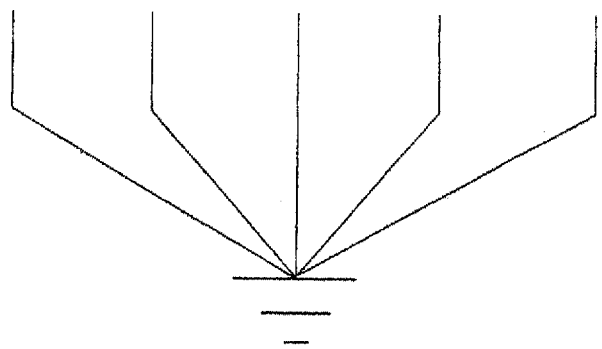
GROUND
SOURCE AT
TRUNK TRAY
FUSE / RELAY
BLOCK
USE GROUND(S) PROVIDED, ONE WITH EACH POWER SOURCE FIG. 17
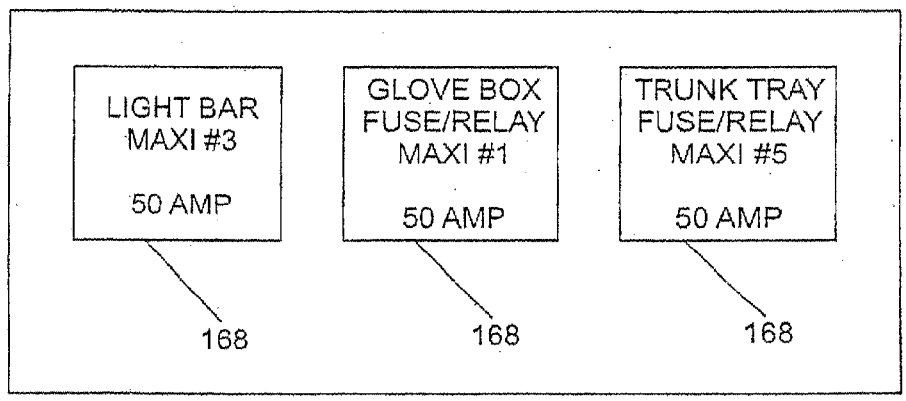
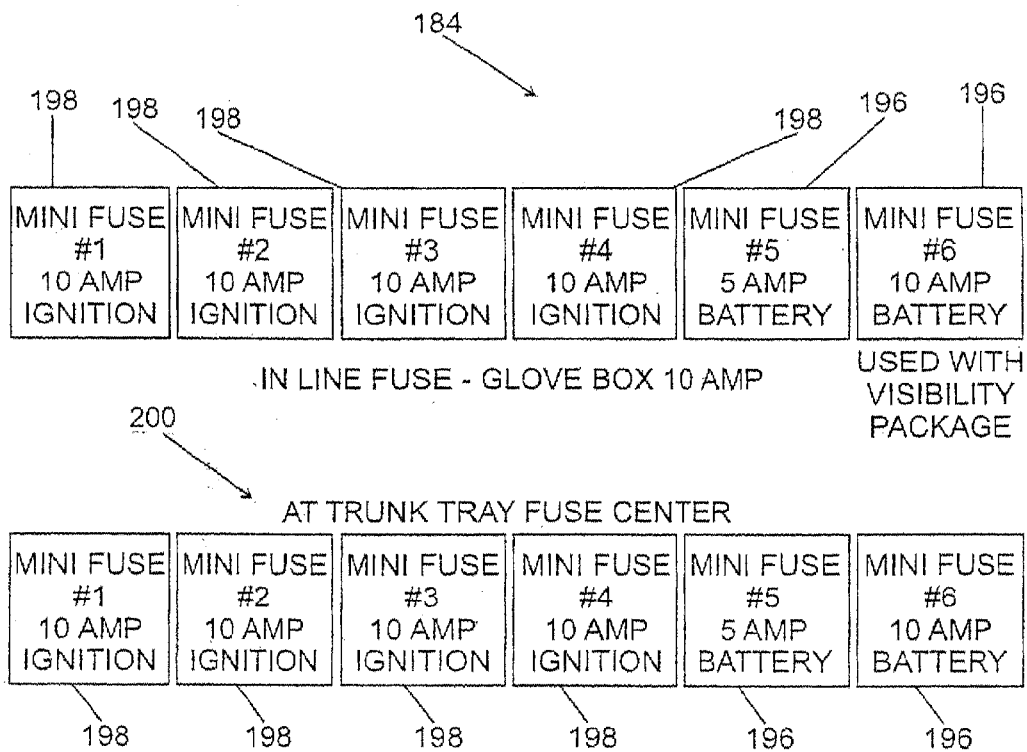

BLUNT CUT AND SEALED BOTH ENDS
USE ONLY IN FUSED CIRCUIT
NOT EXCEEDING 20 AMPS

FIG. 20

```
┌─────────────────────────┐
│   MAXI-FUSE BLOCK AT    │──— 168
│   ENGINE COMPARTMENT    │
└─────────────────────────┘
            │
┌─────────────────────────┐
│   AT BASE OF B-PILLAR   │
│     PASSENGER SIDE      │──— 110
│    BEHIND LOWER COVER   │
└─────────────────────────┘
            │
┌─────────────────────────┐
│                         │
```

END ARE BLUNT
CUT AND SEALED

EMERGENCY VEHICLE WIRING HARNESS AND CONTROL SYSTEM

This application is a continuation-in-part of prior application Ser. No. 09/756,557, filed Jan. 6, 2001, which application claimed the benefit of U.S. Provisional application No. 60/174,754 filed Jan. 6, 2000. Application Ser. Nos. 09/756,557 and 60/174,754 are hereby incorporated by reference.

BACKGROUND OF THE INVENTION

The present invention relates to the conversion of a vehicle for a special purpose, such as with a police car or similar emergency vehicle, or the like. More specifically, the invention relates to a wiring harness and control system for emergency vehicles.

A wide variety of vehicles must be converted for a special use, such as police and emergency vehicles. Police vehicles are a familiar sight to virtually all people through the United States and other industrialized nations. Police cars in particular have become extremely familiar and visible as they patrol various areas through the country. In addition to the typical police car, other agencies having somewhat similar functions and needs often maintain police car type vehicles in a patrol function. Other vehicles such as emergency vehicles including fire fighting vehicles and equipment as well as ambulances and the like must be converted in various ways for their particular function. Such vehicles in many cases utilize many similar systems to one another, and may have similar conversion requirements.

In practice, police agencies and other similar agencies provide emergency vehicles by converting more or less standard automobiles or other vehicles in a process best described as custom installation of the emergency and police equipment. This process has proven to be time consuming and costly and requires significant capital. In addition, the creation of custom installations for each patrol car renders the maintenance process more costly and difficult, thereby increasing capitol requirements and operational and maintenance costs of their fleets. It would be advantageous if departments and agencies could lease their vehicles, but finance companies or other entities are unwilling or reluctant to lease vehicles for such special purposes, or lease rates are increased dramatically, due to the custom conversion for the desired purpose. Before this invention, such custom conversion usually causes permanent damage and alteration of the vehicle. Due to such alterations, the vehicles are substantially devalued for subsequent lease or sale to typical consumers.

Extensive modifications are required in order to convert a standard vehicle into a police car or similar emergency vehicle. In today's high technology world, an assortment of equipment must be installed to meet the in-service needs and requirements of the users. This equipment may include video cameras and recorders, radios, sirens, scanners, computers, printers, radar guns, light bars or other emergency or situational lighting units, antennas, control panels, electronic readouts, cellular phones, equipment compartments, weapon racks, officer protection barriers, and various other accessories. All of this equipment must somehow be mounted in the vehicle in a manner that is convenient to the person operating the vehicle without reducing driver comfort or safety. In addition, many of these devices require running of special wiring for delivery of power and for communication or control purposes. The additional wiring is typically spliced into the existing original equipment manufacturer wiring of the vehicle when the new system is attached. This may result in overloading the existing wiring structure or cause other electrical problems after installation or when the additional wiring is removed. The significant changes and modifications of the vehicle typically performed usually result in the voiding of the vehicle warranty.

These factors provide a dilemma to the fleet manager or the like whose task it is to provide the appropriately equipped vehicles for a department or agency at a minimum cost, minimal maintenance and minimal vehicle downtime for conversion and equipment installation. As a consequence, there remains a need for a simple and cost effective conversion wiring system. Further, there is a need for a conversion wiring system which allows problems associated with custom conversions to be overcome.

SUMMARY OF THE INVENTION

Based upon the foregoing, it is therefore an object of the present invention to provide a wiring harness for an emergency vehicle as either original equipment with the vehicle to allow use as an emergency, police or like vehicle, or provided as an independent harness for conversion of a standard vehicle. In an aftermarket conversion, the system can be easily installed and removed and does not deface the vehicle, thereby retaining the value for subsequent lease or resale of the vehicle, and reducing the total cost of operation of the vehicle as well. The system further eliminates voiding the warranty issues resulting from permanent alterations to the vehicle. If the wiring harness is provided as part of the original equipment manufacturer's wiring harness, the vehicle again is usable as a standard vehicle without adverse impact by the provision of the wiring harness.

It is another object of the present invention to provide a simplified and cost-effective conversion wiring system for converting a vehicle into a police car or similar emergency vehicle.

The invention disclosed and described herein provides a wiring harness for an emergency vehicle comprising a wiring harness, strobe system, rear strobe deck lights or other equipment. The system elements are designed of standard parts to be easily installed and removed from the vehicle. The elements are designed to be attached to the vehicle in a manner not damaging or defacing to the vehicle surfaces.

The foregoing and other aspects will become apparent from the following detailed description of the invention when considered in conjunction with the accompanying drawing figures.

BRIEF DESCRIPTION OF THE DRAWING FIGURES

FIG. 11 is a simplified schematic of the ignition and battery power fuses of the passenger compartment fuse/relay center;

FIG. 16 is a simplified schematic of the ignition and battery power from the fuses of the trunk fuse/relay center;

FIG. 17 is a simplified schematic of the location of the various fuses in the wiring harness;

FIG. 20 is a simplified schematic of the B pillar light circuit.

DETAILED DESCRIPTION

Figure 1:
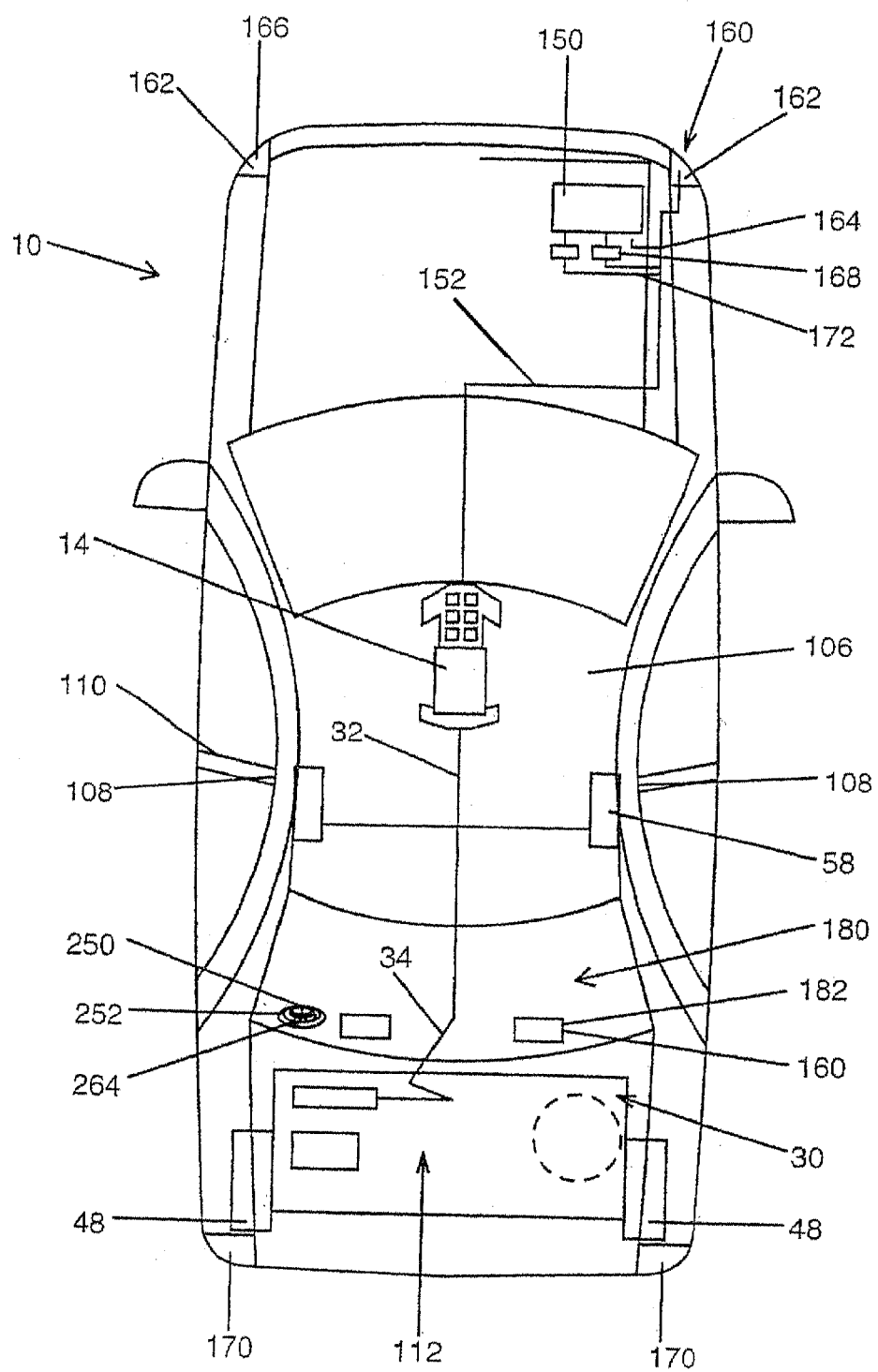
FIG. 1 is a schematic top view of an emergency vehicle illustrating an embodiment of the present invention.

Turning now to the Figures, one embodiment of the invention is shown in conjunction with a standard vehicle 10, such as a four-door sedan, wherein the wiring harness provides desired functionality for use of the vehicle as an emergency or other special purpose vehicle. Referring now to FIG. 1, the vehicle 10 is shown to be converted for use as a police vehicle, wherein the wiring harness according to the present invention allows modification of the standard vehicle 10 to this specialized purpose in a simplified manner and/or without permanent alteration of the visible surfaces of standard vehicle 10. In general, the wiring harness 152 according to the present invention to allow conversion of a vehicle to a police vehicle could include a variety of elements depending upon the needs of the user. Further, as various special purpose vehicles require the addition of electronic and communications equipment mounted adjacent the driver or in other locations in the vehicle, a wiring harness 152 allows for such adaptation without interference with the other wiring for the vehicle 10. If wiring harness 152 is included with the original equipment manufacturer's wiring harness, any potential problems that could be created upon tapping into the existing wiring scheme of vehicle 10 are avoided. In an aftermarket embodiment, the wiring harness is preferably provided to operate independent of the vehicle wiring harness to avoid any such problems. If the wiring harness 152 is provided as an independent harness, it may be configured to extend through a conduit 32 in the passenger area of the vehicle to protect the harness and occupants. The wiring harness 152 may thus be coupled to equipment positioned at various specialized locations about the vehicle 10, again without permanent alteration of the original vehicle 10 or wiring scheme provided therein. In one embodiment, a trunk system 30 may be provided to allow positioning of additional equipment or supplies in the trunk area of the vehicle 10, with power supplied to any such equipment via wiring harness 152 accessed in the trunk, such as by means of the conduit that extends to the trunk region.

Additional equipment that may be provided in conjunction with a police vehicle as shown in FIG. 1 may include a rear deck strobe light/flasher system 160 or other light system mounted in the rear compartment of the vehicle adjacent the rear window at the parcel shelf 112 or other location. A strobe mounting plate and cover may be mounted to existing attachment locations to facilitate this. Each of these systems as well as other details of the preferred embodiment will be understood as the description proceeds.

The wiring harness 152 is, in one embodiment, separate from the original equipment wiring of the vehicle 10 and is directly connected to the battery 150 of the vehicle 10, and preferably with a positive ground. The wiring harness 152 is used to provide power to all of the ancillary emergency vehicle add-on components (not shown) such as video cameras and recorders, radios, sirens, scanners, computers, printers, radar guns, lighting units, antennas, control panels, electronics readouts, cellular phones, equipment compartments, gun locks, and various other accessories. No splicing into the original equipment wiring harness is required when wiring harness 152 is being added after the vehicle has been manufactured. The various wires of the wiring harness 152 are connected to a power distribution center 184, which may be positioned in the driver's compartment at a location to be accessible in the compartment, such as in the glove box, under the front dash or attached to a console 16 for easy access. Other locations in the passengers' compartment may be suitable. A second power distribution center 200 may be positioned in the trunk region for easy access relative to equipment located therein. As shown in FIG. 1, the wiring harness 152 may be operatively connected to the battery 150 of the vehicle, and may conveniently couple power to strobe bulbs or LEDs 162 in the front parking lenses or marker light housings and rear strobe bulbs or LEDs 170 positioned in rear light housings of the vehicle 10. The wiring harness 152 may also include a siren wire pre-run at 164, isolating fuses 168 associated with the power and ground wires, and prewired strobe conductor cables. The wiring harness 152 extends rearward to the trunk system 30 with various hook-up points for easy component installation.

The wiring harness 152 may also comprise a trunk system 30. The trunk system preferably includes an air circulation system 250 (shown in FIG. 1), for circulating heating or cooling air to the trunk region to maintain a desired environment for equipment positioned in the trunk. The air circulation system 250 may comprise at least one fan 252, which may be mounted in the existing speaker housings 264 or otherwise mounted. The fan 252 may be configured to pull air from the vehicle interior to the trunk. The air circulation system 250 helps to ensure that any communications or other sensitive equipment in the trunk does not overheat by circulating cool air from the air conditioned vehicle interior. In cold conditions, the fans 252 prevent condensation by circulating warm air from the heated vehicle interior.

The emergency vehicle 10 may include a roof top lighting system (not shown) such as the light bar typically used on police vehicles. To facilitate the installation of a roof top lighting system, the wiring harness 152 includes a power conductor 210 for providing power to the roof top lighting system. Preferably, a portion of power conductor 210 is prepositioned at the base of a B pillar 110 of vehicle 10. In use, wire 210 is installed by positioning the wire in or along B pillar 110 and passing it to the exterior of the vehicle 10 through an aperture 108 formed in the B pillar 110. Aperture 108 may be finished with a rubber grommet when wire 210 is removed, leaving vehicle 10 substantially as originally manufactured. Preferably, a ground wire is included with wire 210 to provide a ground for roof top lighting system without relying on a ground connection through the vehicle body. Additionally, control wires (not shown) can be provided to the roof top lighting system.

A strobe system 160 comprising additional front strobe bulbs or LEDs 162 positioned in the parking light lens or front marker light housings 166 may be connected to the wiring harness 152. Rear deck strobe lights or LEDs 258 may be mounted on the on the rear deck of the passenger compartment, and rear strobe lights or LEDs 170 positioned in the rear turn signal light housings. The rear deck strobe lights or LEDs 258 are secured to a strobe mounting plate 180, which is mounted on an existing attachment area such as the rear parcel shelf 112 in vehicle 10. The lights are protected from the interior of the vehicle by a rear strobe cover 182 which also prevents light flash back toward the interior of the vehicle.

Figures 2A, 2B:
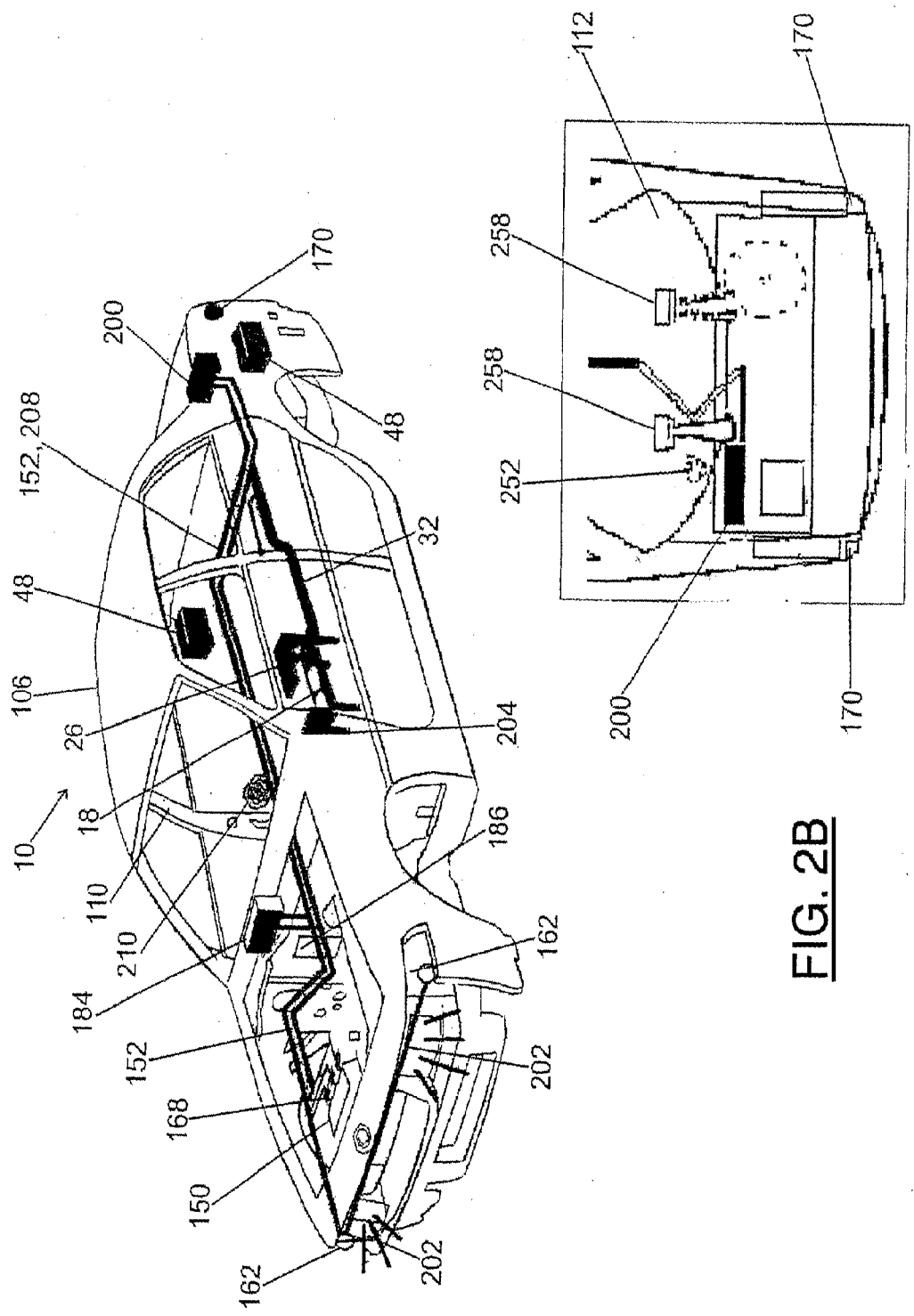
FIG. 2A is a perspective view of an emergency vehicle illustrating an embodiment of the present invention.
FIG. 2B is a top view of an alternate embodiment of the trunk system and ancillary equipment of the present invention.

In a preferred embodiment, the wiring harness of the present invention is as shown in FIGS. 2A and 2B. Referring now to FIG. 2A, wiring harness 152 runs along the passenger side of vehicle 10 in original equipment convolute tubing within the body wall of vehicle 10. Wiring harness 152 takes power from the existing vehicle battery 150 and distributes power to various points in the vehicle. Maxi fuses 168 restrict current draw from the battery to several circuits in the wiring harness 152. Preferably, two fuse/relay centers or power distribution centers 184, 200 are provided, one in the passenger compartment and another in the trunk. Also, preferably, each power distribution center 184, 200 is separately fused. However, both power distribution centers 184, 200 can be protected by the same fuse. These fuse/relay centers provide battery and ignition controlled power to various add-on equipment that may be provided for the emergency vehicle. Such equipment may include but is not limited to video cameras and recorders, radios, sirens, scanners, computers, printers, radar guns, lighting units, antennas, control panels, electronics readouts, cellular phones, equipment compartments, gun locks, and various other accessories.

Figure 3:
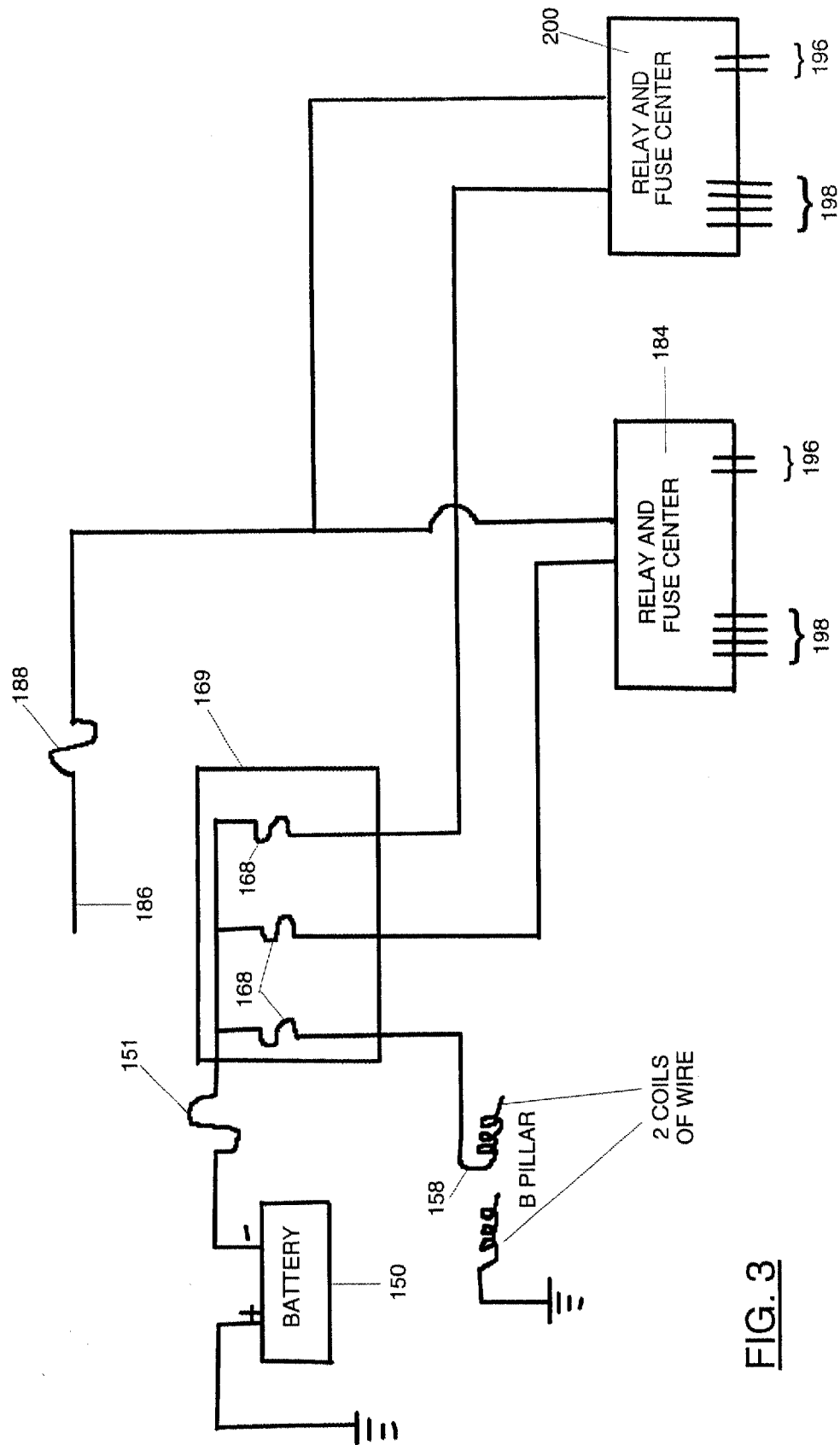
FIG. 3 is a schematic electrical diagram illustrating the main components of the wiring system.

Connectivity of the wiring harness to various ancillary add-on equipment desired by a user of the converted vehicle will vary depending on the particular needs of the user. In one embodiment, the detailed wiring schematic is shown in FIGS. 3 through 7. FIG. 3 shows an overview of the main portions of wiring harness 152.

Battery power from battery 150 through fuse 151 is provided to two relay fuse centers or power distribution centers 184, 200 and a roof top lighting system wire 158. A fuse module 169 separately fuses each power distribution center 184, 200 and the roof top lighting system wire 158 with maxi fuses 168. A power source 186 is provided to the relay fuse centers 184, 200 through fuse 188. The power source 186 is preferably ignition controlled. Each relay fuse center 184, 200 provides ignition controlled power sources 198 and constant power sources 196 to a variety of add-on equipment. Preferably, the power for the ignition controlled power source 198 is from battery 150.

Figure 4:
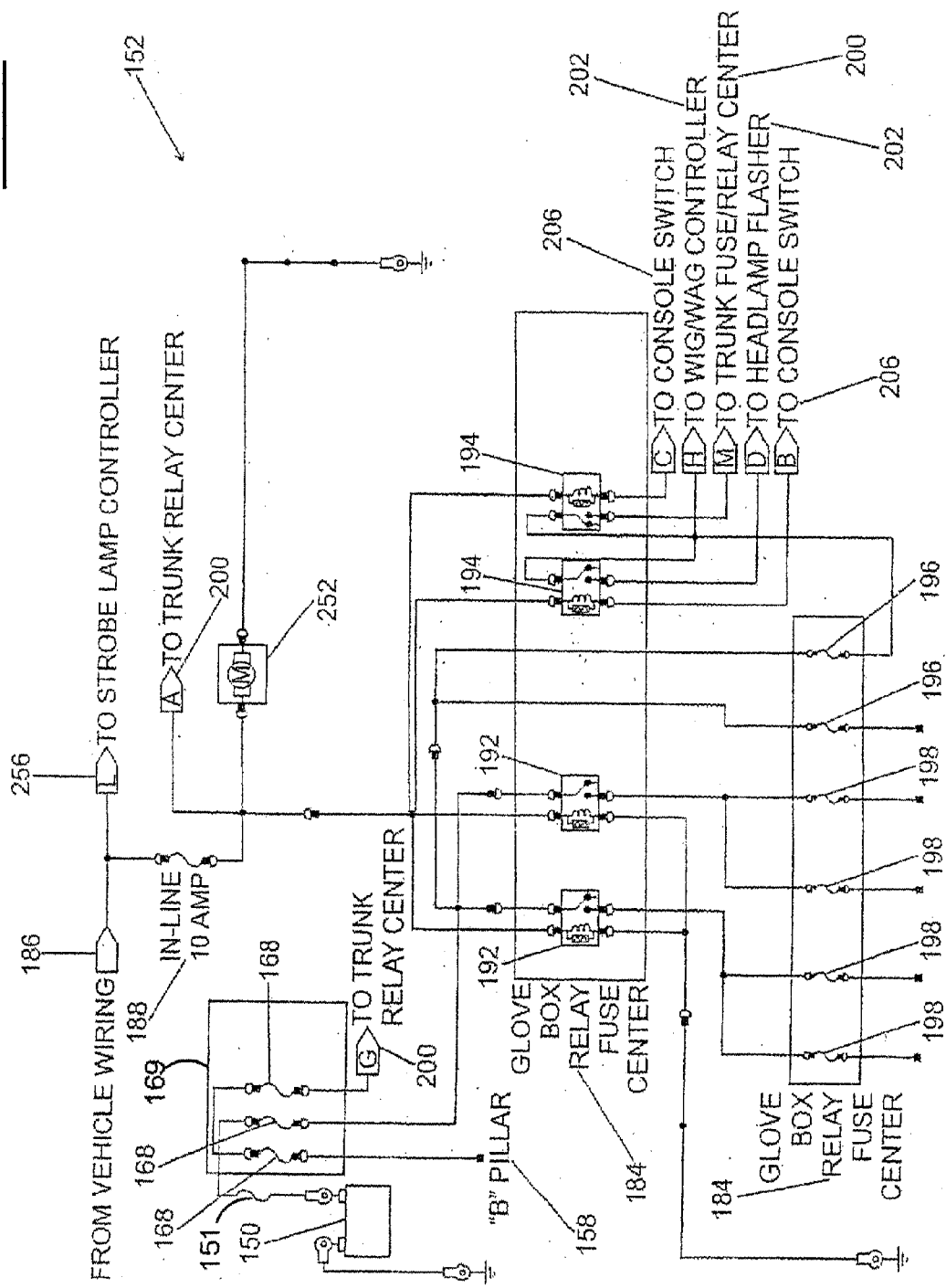
FIG. 4 is an aspect of the wiring schematic of the wiring harness of the present invention.
Figure 5:
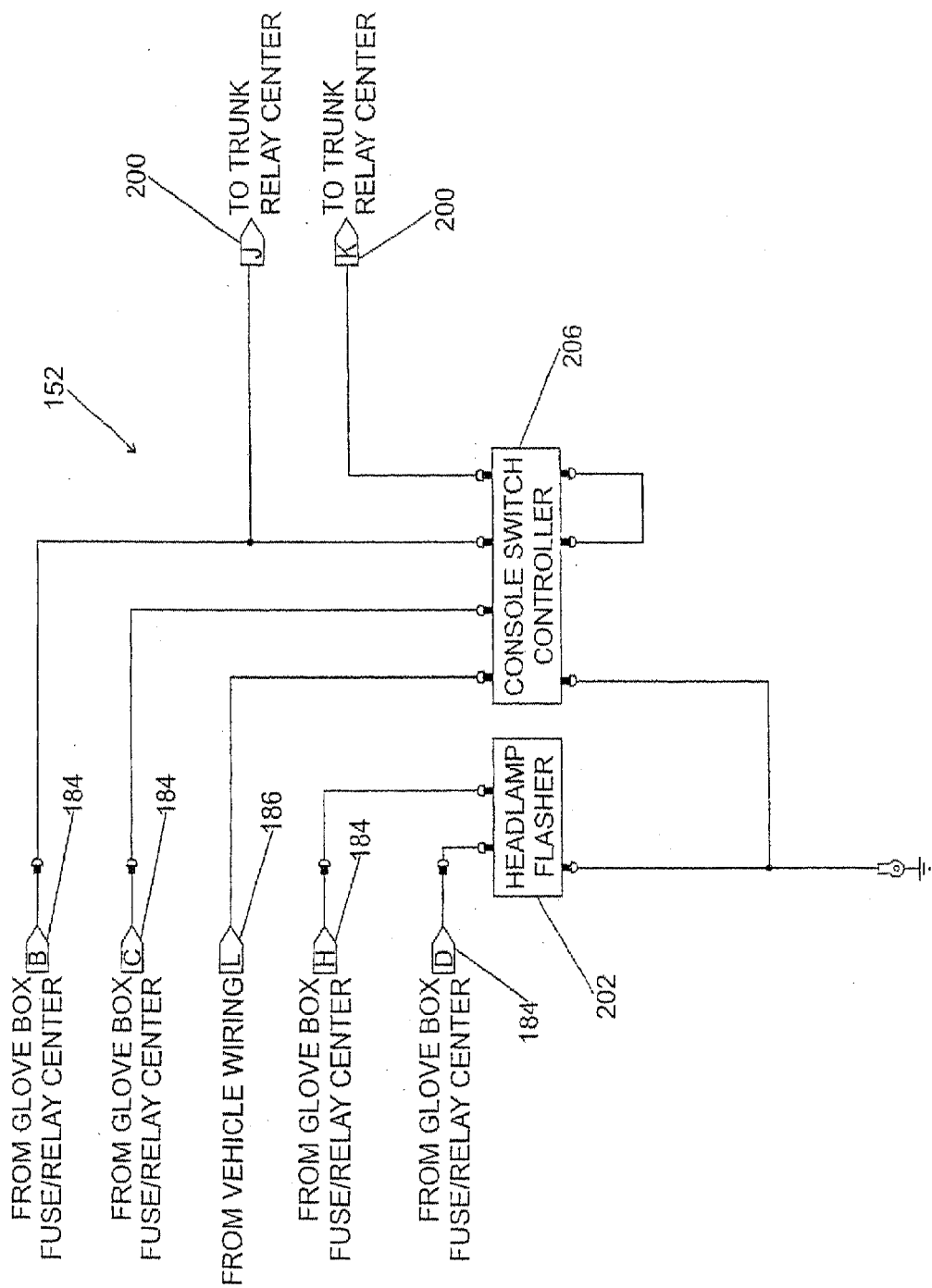
FIG. 5 is another aspect of the wiring schematic.

Referring now to FIG. 4, several aspects of wiring harness 152 are shown in detail. As will be appreciated by the skilled practitioner, wire harness 152 provides both battery and ignition controlled power as required by the various electrical appliances associated with vehicle 10. Electrical current supplied by battery 150 is regulated by maxi fuse 168, with connections to passenger compartment relay/fuse center 184. Passenger compartment relay/fuse center 184 includes two full relays 192 and two half or control relays 194 as shown in FIGS. 4, 9, 10, and 12. An ignition power trigger to activate the relays 192 and 194 may be provided at the original equipment wiring 186 at the passenger kick panel, or directly wired in an original equipment embodiment. Power from the original equipment manufacturer wiring is regulated by an in-line fuse 188. Relays 192 and 194 thus provide ignition controlled power at fuses 198. Battery power is provided at fuses 196. Connections from half relays (or control relays) 194 are provided to console switch controller 206, and trunk relay/fuse center 200 as indicated in FIGS. 4, 5 and 6 Grounding of all passenger compartment fuse/relay circuits are as indicated in FIG. 11.

Preferably, a wig-wag/head lamp flasher controller 202 is provided with wiring harness 152. However, the wig-wag/head lamp flasher controller 202 or other type of head lamp flasher controller could be provided separately. In this case, the wiring harness 152 would include wiring pre-positioned near the head lights and connectors adapted to be connected to the high beam head lights.

Figure 8:
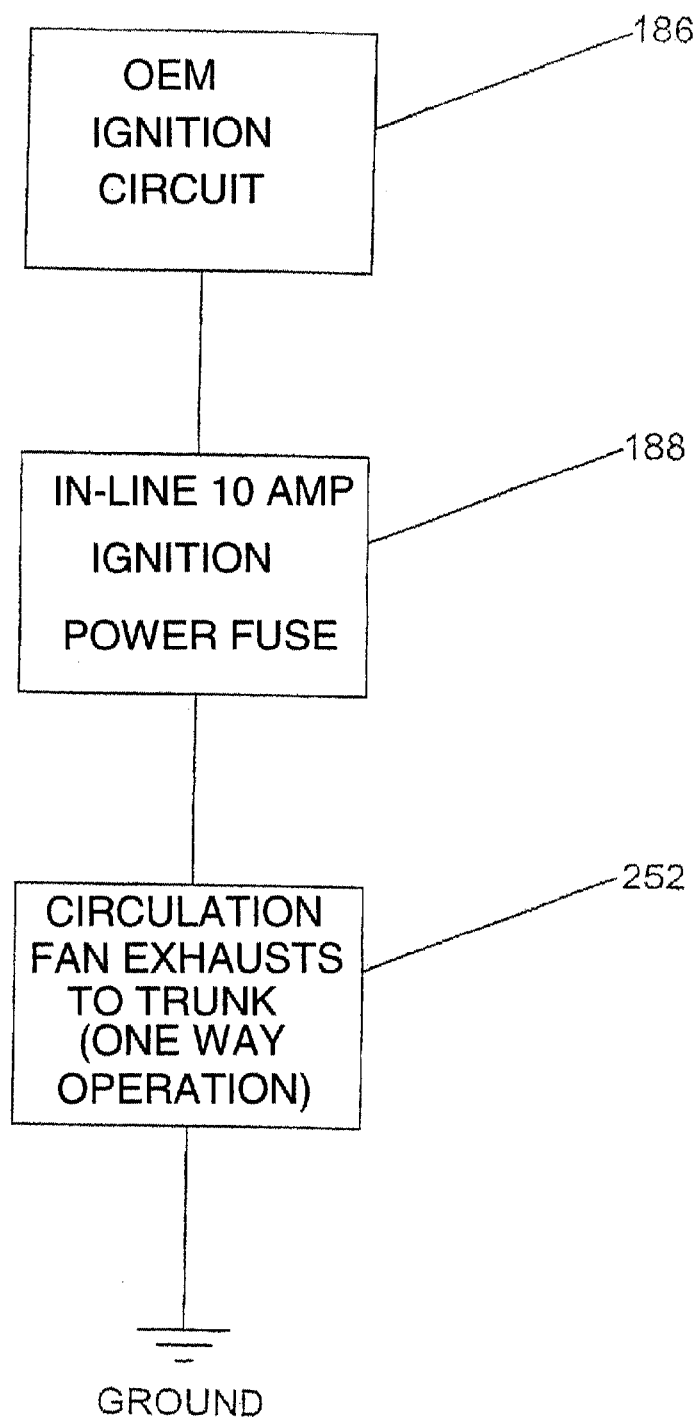
FIG. 8 is a simplified wiring schematic of the parcel shelf air circulation fan.
Figure 9:
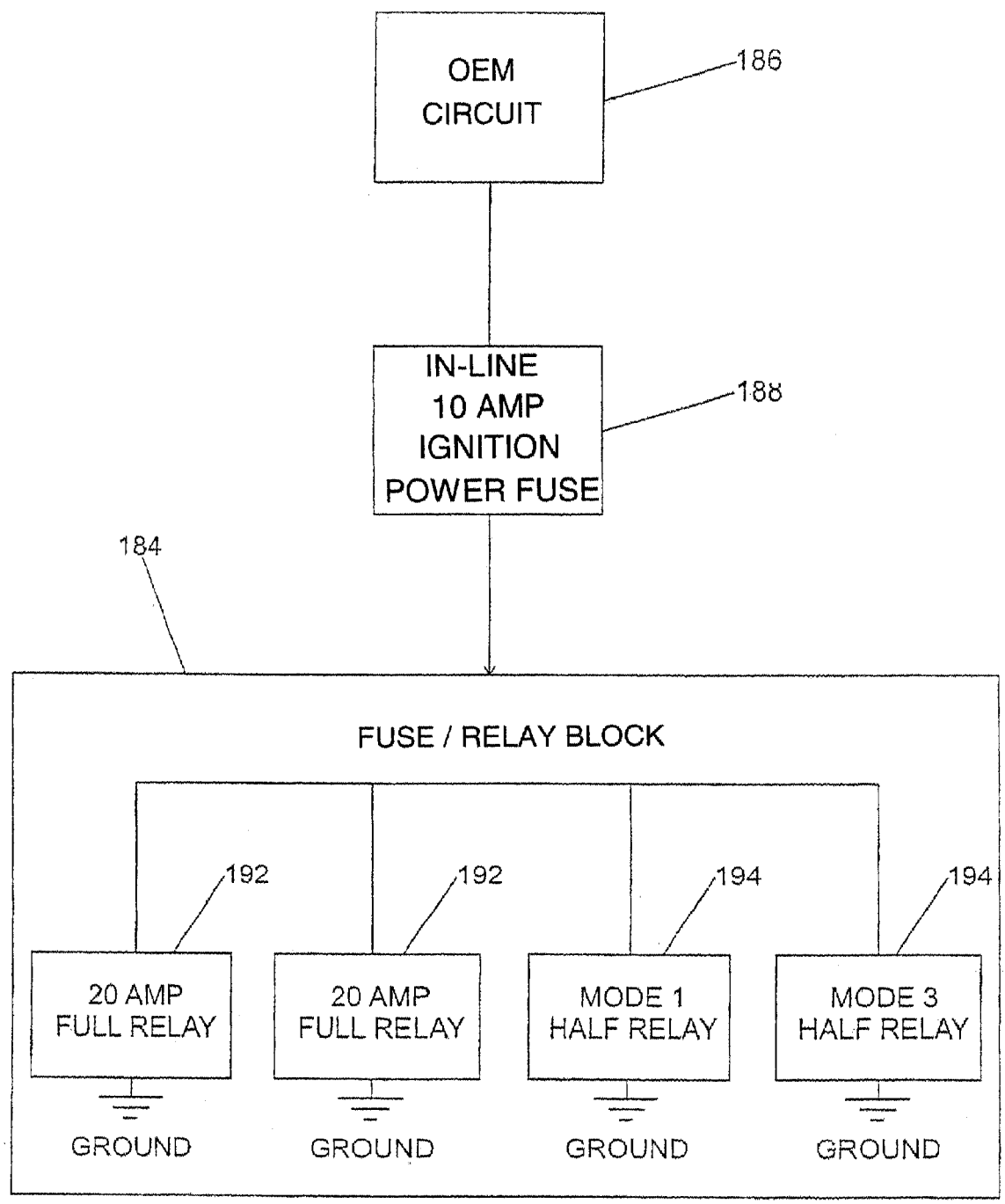
FIG. 9 is a simplified schematic of the ignition power trigger to the passenger compartment relays.
Figure 10:
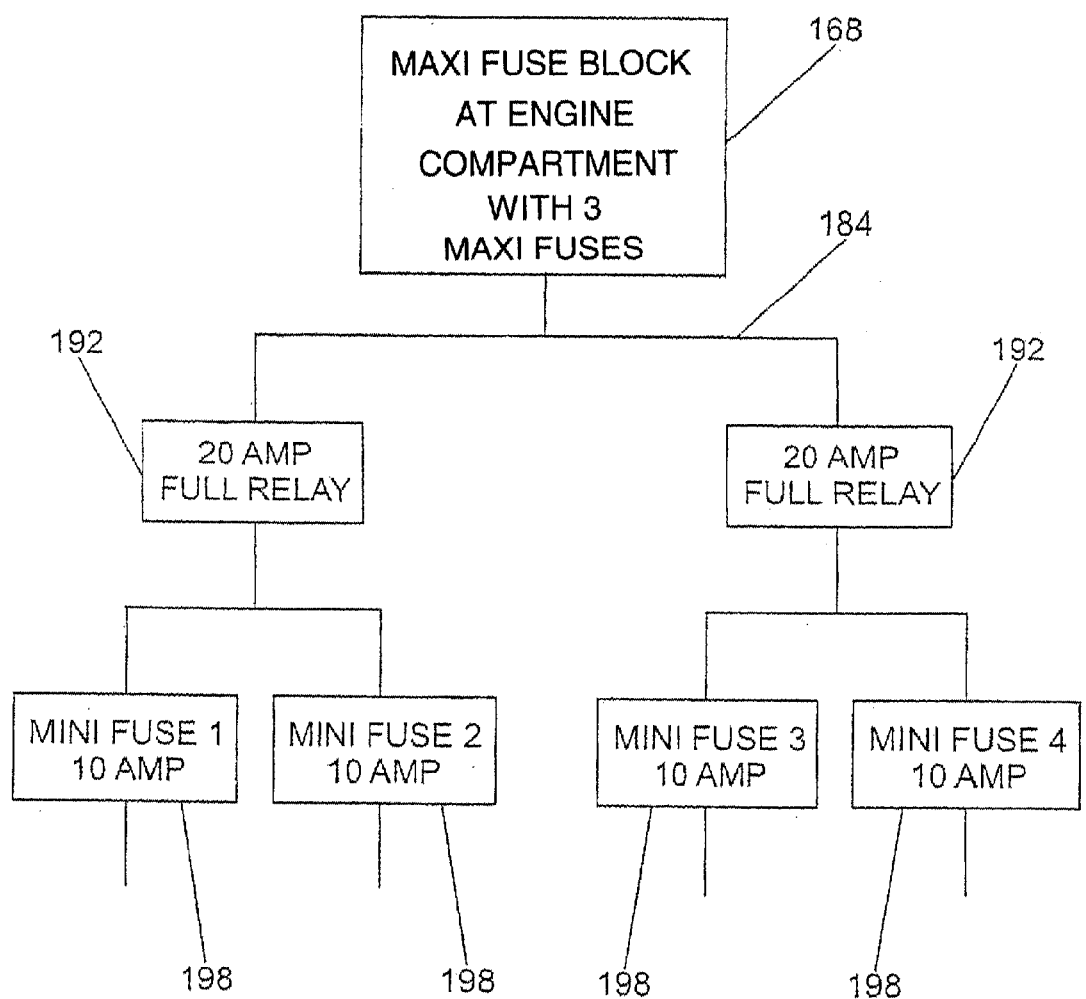
FIG. 10 is a simplified schematic of the ignition power from the passenger compartment relays.
Figure 12:
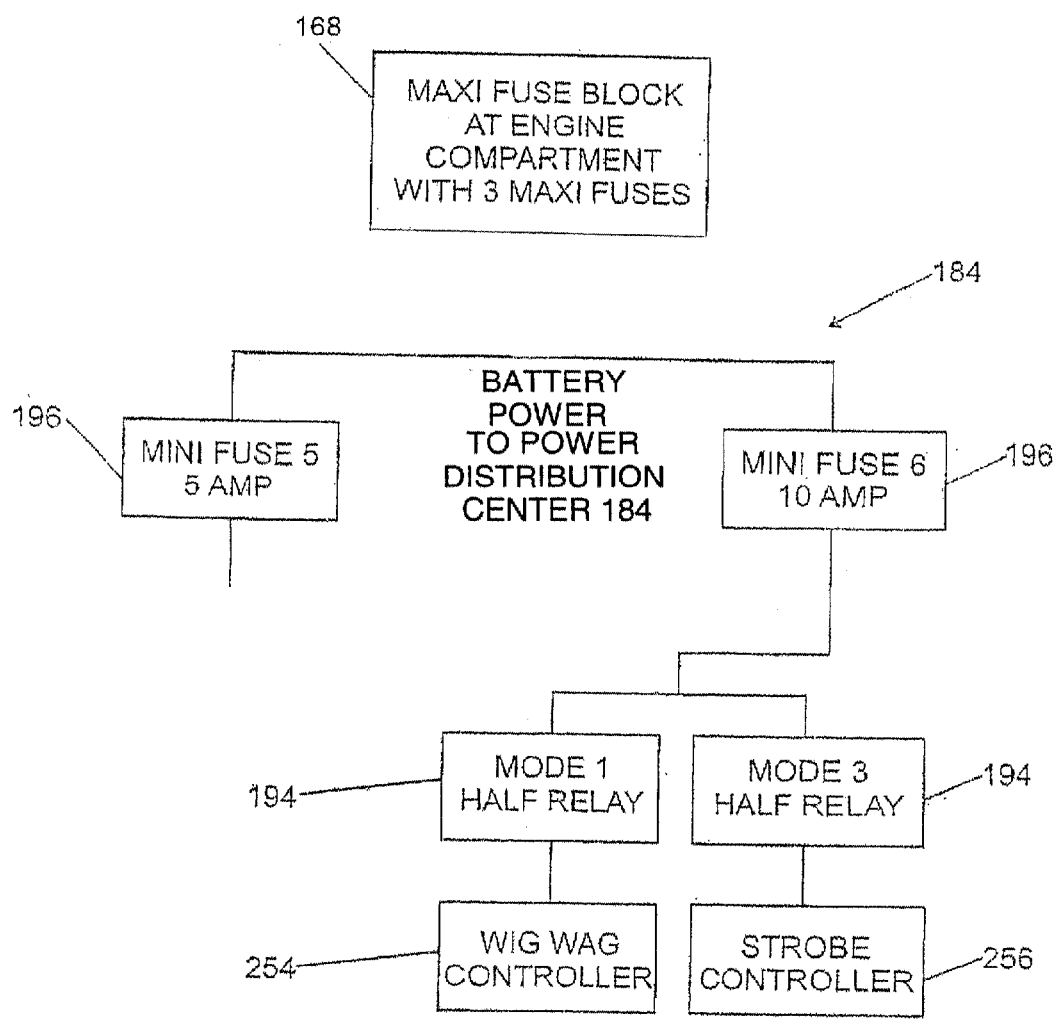
FIG. 12 is a simplified schematic of the battery power from the passenger compartment fuse/relay center.
Figure 13:
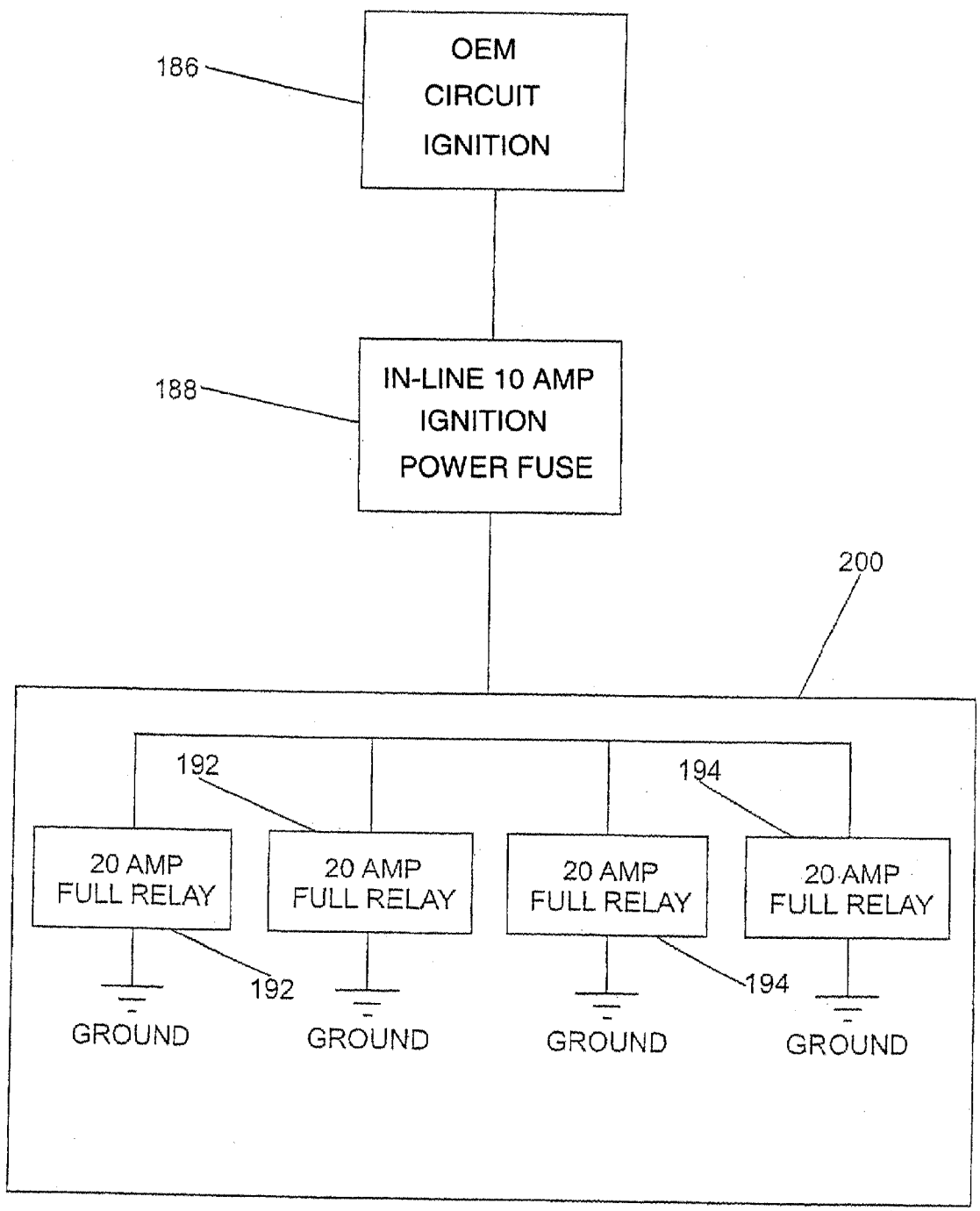
FIG. 13 is a simplified schematic of the ignition power trigger to the trunk relays.
Figure 14:
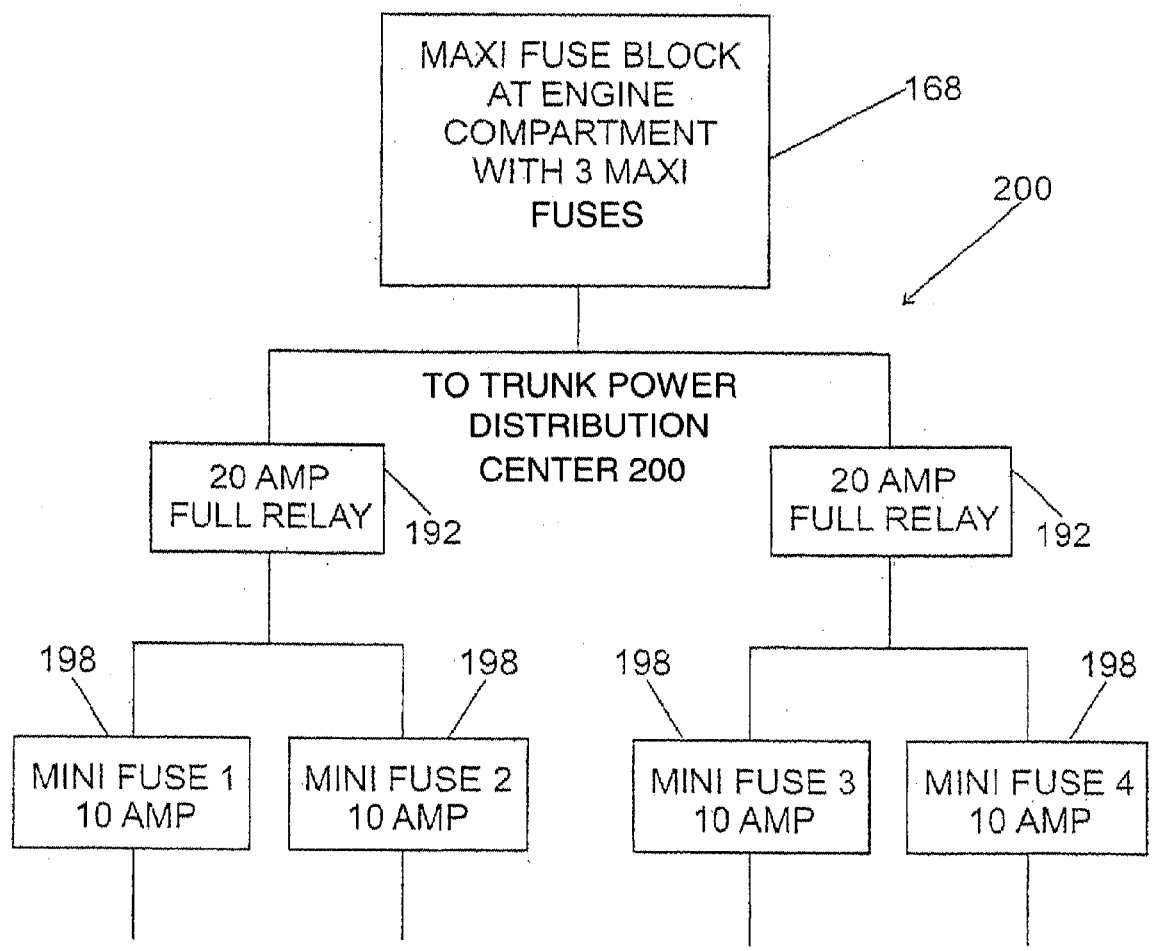
FIG. 14 is a simplified schematic of the ignition power from the trunk fuse/relay center.
Figure 15:
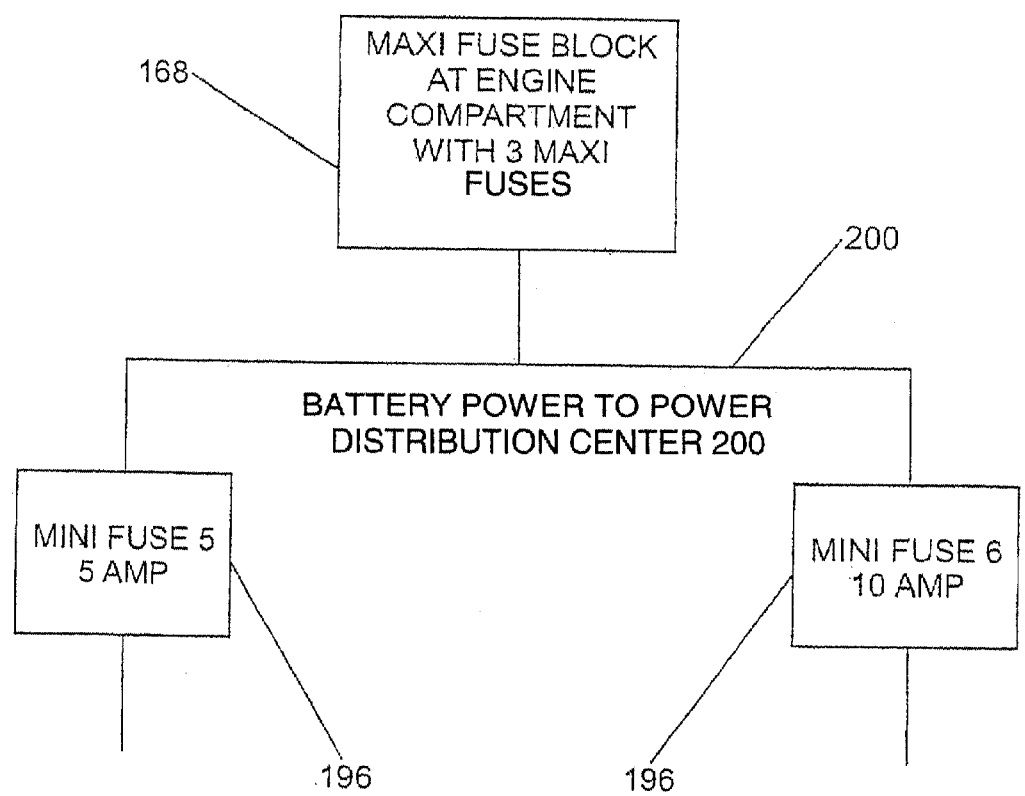
FIG. 15 is a simplified schematic of the battery power from the trunk fuse/relay center.

Ignition power from the original equipment manufacturer circuit 186 also provides power to strobe controller 256, trunk fuse/relay center 200 and fan 252. As indicated in FIGS. 4 and 8, original equipment manufacturer ignition circuit 186 at the passenger kick panel provides power through in-line fuse 188 to circulation fan 252 at the parcel shelf 112 of the vehicle 10. Circulation fan 252 provides one-way infusion of air from the passenger compartment to the trunk to provide conditioned air to protect sensitive equipment mounted in the trunk compartment.

Figure 6:
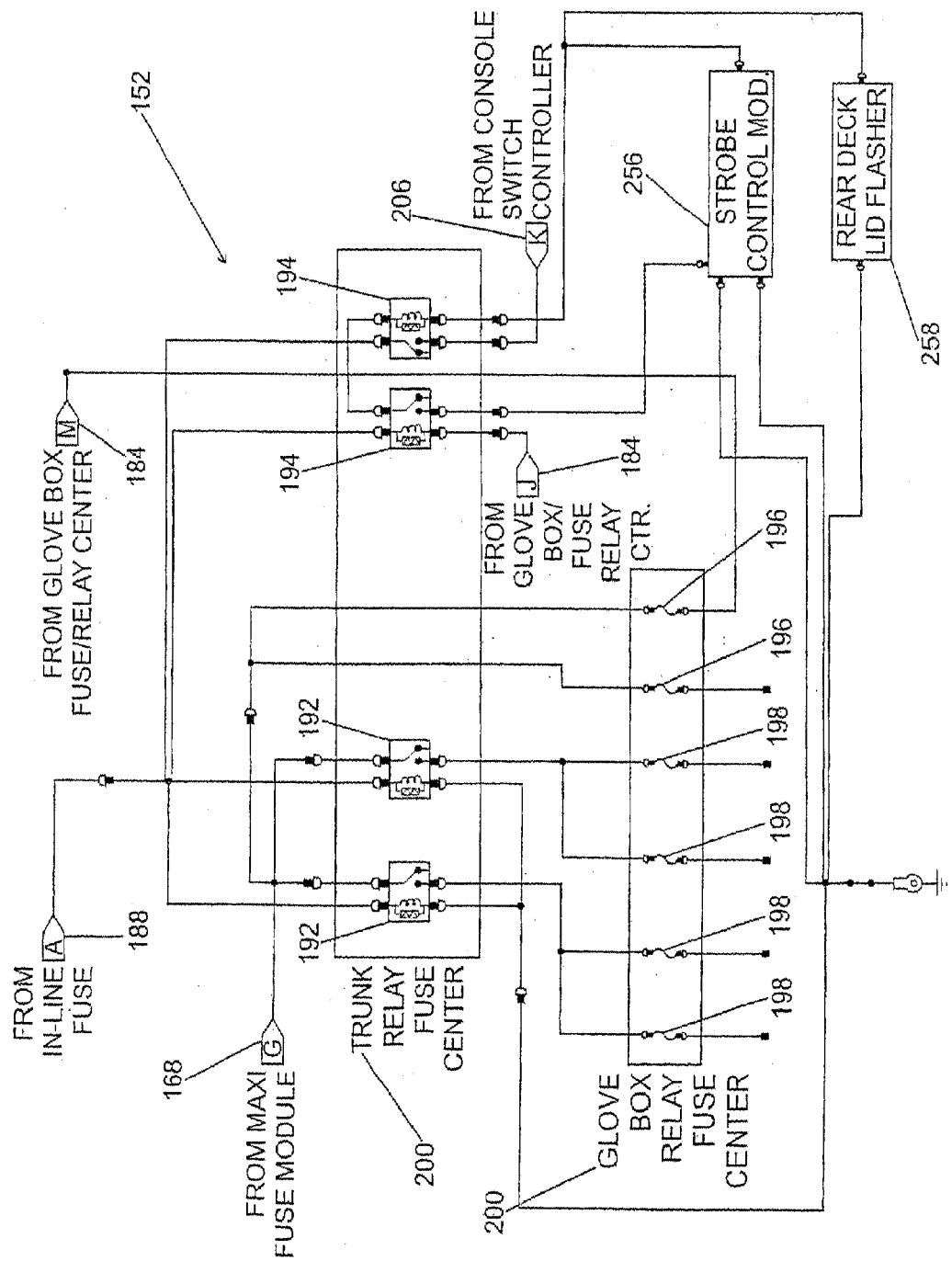
FIG. 6 is another aspect of the wiring schematic.

Referring now to FIG. 6, several further aspects of wiring harness 152 are shown in detail. Electrical current supplied by battery 150 is regulated by maxi fuse 168, with connections to trunk relay/fuse center 200. Similar to passenger compartment relay/fuse center 184, trunk relay/fuse center 200 includes two full relays 192 and two half or control relays 194 as shown in FIGS. 6, 13, 14 and 15. An ignition power trigger to activate the relays 192 and 194 is provided at the original equipment wiring 186 at the passenger kick panel. Power from the original equipment manufacturer wiring is regulated by an in-line fuse 188. Relays 192 and 194 thus provide ignition controlled power at fuses 198. Battery or constant power is provided at fuses 196. Connections from half relays 194 are provided to strobe controller 256 and rear deck lid flasher 258. Grounding of all trunk fuse/relay circuits are as indicated in FIG. 16.

Figure 18:
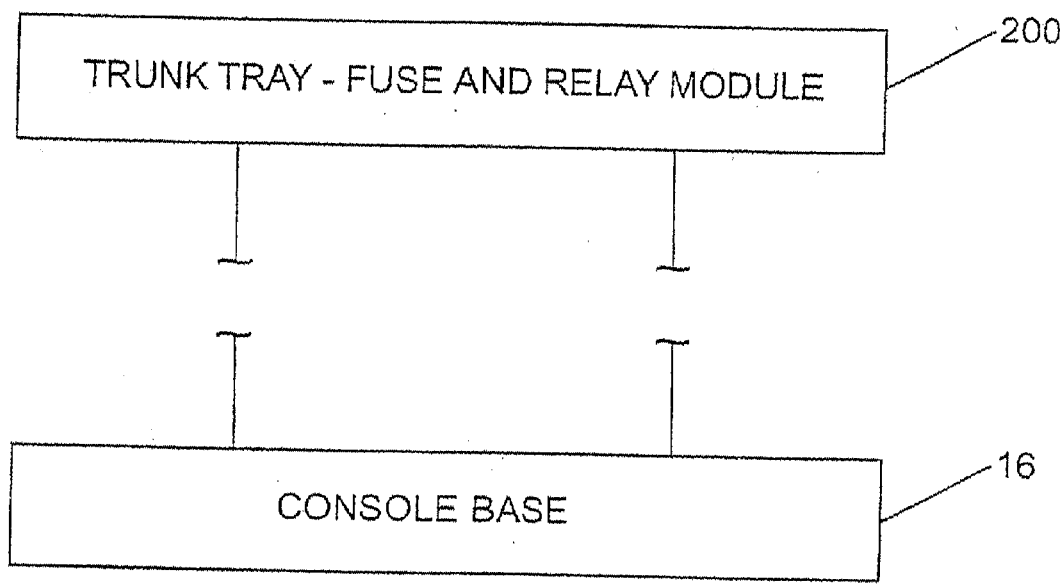
FIG. 18 is a simplified schematic of the extra circuits from the trunk fuse/relay center to the console.
Figure 19:
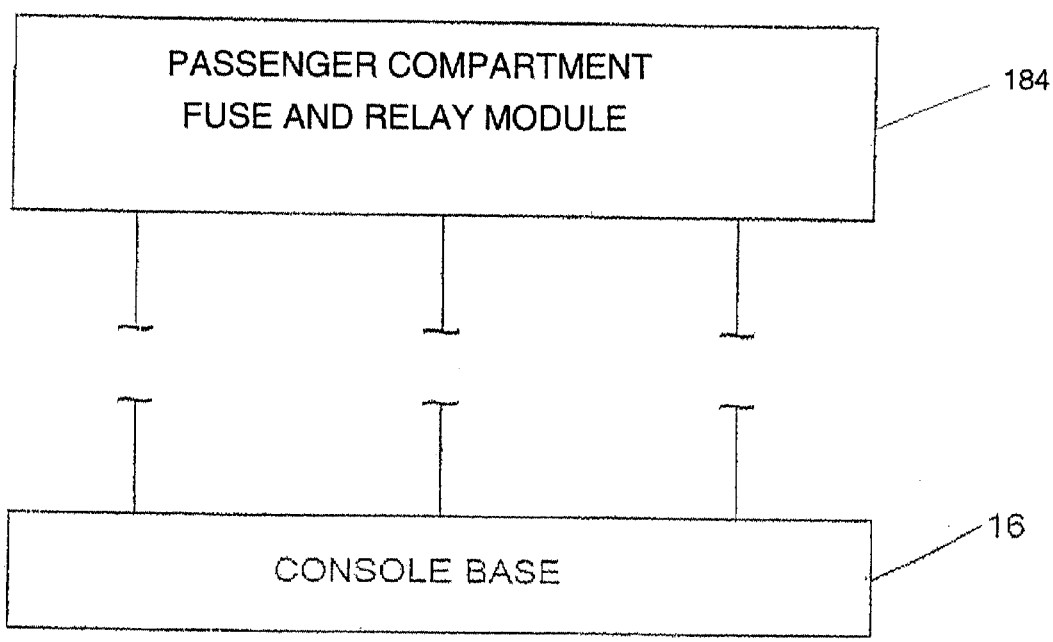
FIG. 19 is a simplified schematic of the extra original equipment manufacturer circuits from the engine compartment to the console.

Wiring harness 152 thus provides dual fuse/relay centers in the passenger compartment and the trunk, as indicated in FIGS. 3 and 17. Battery power from maxi fuses 168 in the main engine compartment is routed via wiring harness 152 to the dual fuse/relay centers 184 and 200 to provide battery and ignition controlled power in the passenger compartment and trunk simultaneously as previously described. Unused circuits from trunk tray fuse center 200 may be routed to console 16 via conduit 32 as indicated in FIGS. 2A and 18, or to another location as desired. Additional unused original equipment manufacturer circuits from the engine compartment may be routed via the passenger side wheel tub to console 16 as indicated in FIGS. 2A and 19, or to another location as desired.

Figure 7:
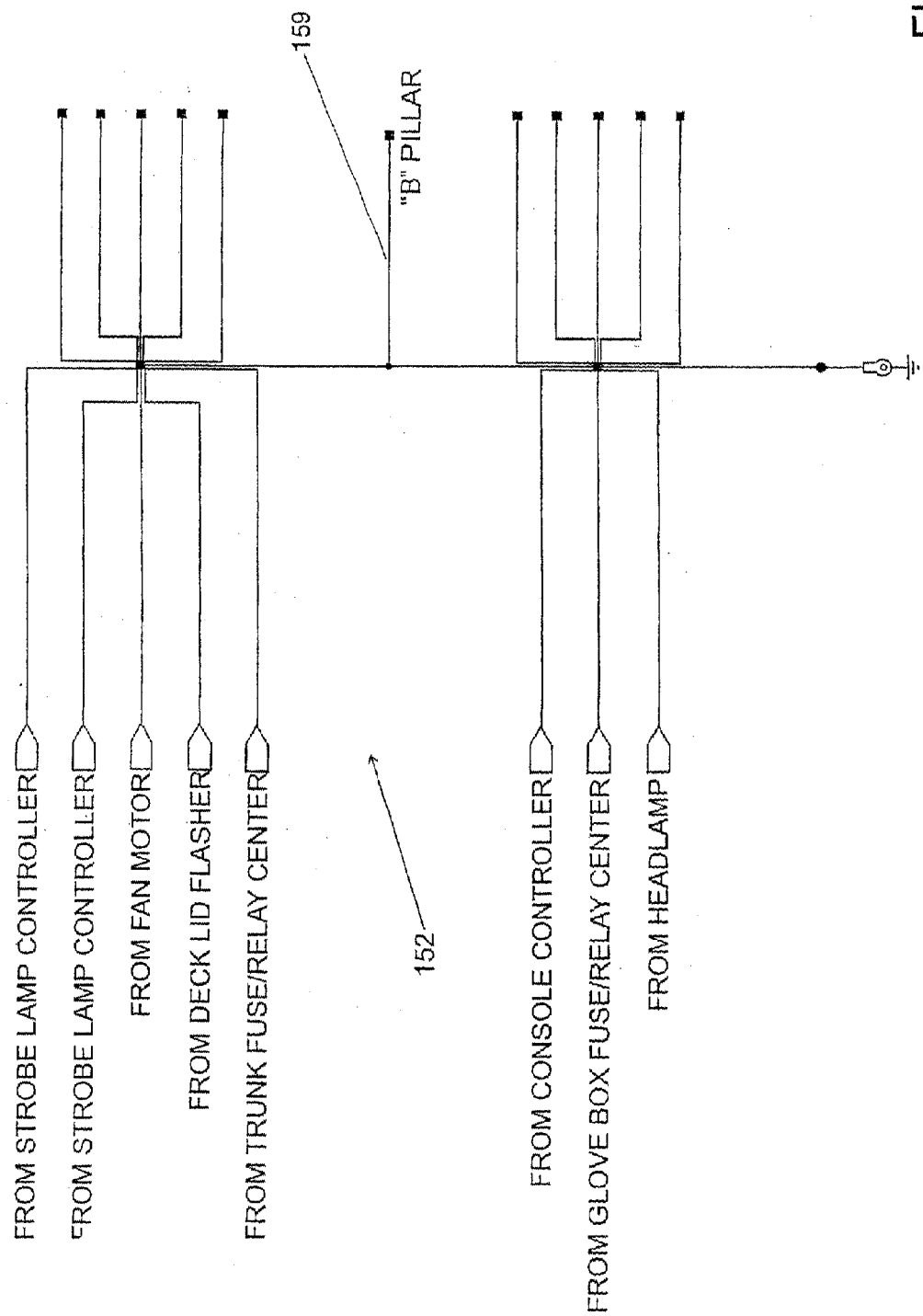
FIG. 7 is another aspect of the wiring schematic.

As shown in FIGS. 2A, 4 and 20, battery 150 provides power 158 to a roof top lighting system (not shown)

mounted on the roof of vehicle 10. Power is supplied though maxi fuse 168 to B pillar 110, with wire coil 210 pre-positioned at the base of B pillar 110. If connected to a roof top lighting system or other ancillary accessory, wire coil 210 may be extended through B pillar 110 and through aperture 108 to connect power to the light. Preferably, a ground wire 159 (as shown in FIG. 7) is included with wire coil 210 at the base of B pillar 110.

As is apparent from FIGS. 2A, and 2B, wiring harness 152 may be routed through conduit 32 or through existing, original equipment manufacturer convolute tubing to the fuse/relay centers and connections. Use of either of these two methods of routing the wiring harness 152 enables the wiring harness to be installed into an original equipment vehicle to convert it to a special purpose vehicle. If it is desired to revert the converted vehicle back to a non-special purpose vehicle, the wiring harness 152 may be removed from the vehicle without defacing the vehicle or the original equipment manufacturer wiring harness or the wiring harness 152 may be simply disconnected from ancillary equipment that is subsequently removed, and the wiring harness 152 may be abandoned and left to remain unseen in the convolute.

Wiring harness 152 may be wholly or partly extended though conduit 32. In some cases, wires from trunk fuse/relay center 200 may be extended through conduit 32 from the trunk to a control console. Such connections may include console switch controller 206 to activate or deactivate various ancillary equipment such as strobes, flashers, or overhead lights, and may also include connections to other ancillary equipment located in the trunk such as radio transmitters, etc.

Although the present invention has been described above in detail, the same it by way of illustration and example only and is not to be taken as a limitation on the present invention. Accordingly, the scope and content of the present invention are to be defined only by the terms of the appended claims.

Having described the invention, what is claimed is:

1. In an automotive electrical system for use with a vehicle having a battery, the battery having a power connector and a ground connector, and an ignition controlled power source, the vehicle having a B pillar, a passenger compartment and a trunk, the improvement comprising:
    a fused electrical connection to the battery power connector;
    a fuse module electrically connected to the fused electrical connection, the fuse module comprising a plurality of fuses;
    at least one power distribution center having inputs electrically connected to one of the fuse module plurality of fuses and to the ignition controlled power source;
    a roof top lighting system electrical conductor electrically connected to another of the fuse module plurality of fuses and adapted to be electrically connected to a roof top lighting system.

2. The improvement according to claim 1, wherein the adaptation of the roof top lighting system electrical conductor to be connected to a roof top lighting system includes a portion of the roof top lighting system electrical conductor being pre-positioned at a base of the B pillar.

3. The improvement according to claim 1, further comprising:
    a ground electrical conductor electrically connected to the battery ground connector and adapted to be electrically connected to a rooftop lighting system.

4. The improvement according to claim 3, wherein the adaptation of the roof top lighting system electrical conductor to be connected to a roof top lighting system includes a portion of the roof top lighting system electrical conductor being pre-positioned at a base of the B pillar; and the adaptation of the ground electrical conductor to be connected to a roof top lighting system includes a portion of the ground electrical conductor being pre-positioned at a base of the B pillar.

5. The improvement according to claim 1, wherein the number of power distribution centers is at least two, each power distribution center being electrically connected to a corresponding fuse of the plurality of fuses.

6. The improvement according to claim 1, wherein the number of power distribution centers is two, one power distribution center being located in the passenger compartment, the other power distribution center being located in the trunk.

7. The improvement according to claim 1, wherein the at least one power distribution center includes at least one fuse and at least one relay.

8. The improvement according to claim 1, wherein the at least one power distribution center provides both constant power connections and ignition controlled power connections.

9. The improvement according to claim 1, wherein the at least one power distribution center includes at least one ignition power controlled relay electrically connected to the power distribution center fused electrical connection input and to the power distribution center ignition controlled power source input.

10. The improvement according to claim 1, further comprising:
    a rear shelf mounted light assembly electrically connected to a power distribution center, the light assembly being activated by a vehicle on/off switch.

11. The improvement according to claim 1, further comprising:
    a plurality of grill lights electrically connected to a power distribution center.

12. The improvement according to claim 1, further comprising:
    speaker wiring adapted to connect a means for generating siren sounds and amplifying sounds to a speaker.

13. The improvement according to claim 1, further comprising:
    wiring adapted to connect a wig-wag controller to high beam head lights.

14. The improvement according to claim 13, wherein the wiring includes a plurality of connectors adapted to be connected to the high beam head lights.

15. The improvement according to claim 13, further comprising:
    a wig-wag controller electrically connected to a power distribution center and to the wiring.

16. The improvement according to claim 1, further comprising:
    a rear strobe light assembly for connection to a power distribution center.

17. The improvement according to claim 1, further comprising:
    a means for increasing visibility of the vehicle by activating one or more lights.

18. The improvement according to claim 17, wherein the means for increasing visibility includes a controller for activating the one or more lights in an attention gathering manner.

19. The improvement according to claim 18, wherein the means for increasing visibility includes a plurality of lights including at least one of a strobe light and a LED light.

20. The improvement according to claim 19, wherein the plurality of lights are positioned in at least one of a rear shelf mounted light assembly, rear turn signal light housings, a front grill and a front marker light housing.

21. The improvement according to claim 1, further comprising:
   a vehicle visibility enhancing light assembly electrically connected to a power distribution center.

22. The improvement according to claim 21, wherein the vehicle visibility enhancing light assembly includes a controller for activating one or more lights in an attention gathering manner.

23. In an automotive electrical system for use with a vehicle having a battery, the battery having a power connector and a ground connector, and an ignition controlled power source, the vehicle having a B pillar, a passenger compartment and a trunk, the improvement comprising:
   a fused electrical connection to the battery power connector;
   at least one power distribution center having inputs electrically connected to the fused electrical connection and to the ignition controlled power source, the at least one power distribution center including at least one ignition power controlled relay electrically connected to the power distribution center fused electrical connection input and to the power distribution center ignition controlled power source input, the at least one power distribution center further including at least one fuse electrically connected to the power distribution center fused electrical connection input via an output of the at least one ignition power controlled relay; and
   a roof top lighting system electrical conductor electrically connected to the fused electrical connector and adapted to be electrically connected to a rooftop lighting system.

24. The improvement according to claim 23, wherein the at least one power distribution further includes at least one fuse directly connected to the power distribution center fused electrical connection input.

25. The improvement according to claim 23, wherein the at least one power distribution further includes at least one control relay.

26. A wiring system for use with a vehicle having a battery, the battery having a power connector and a ground connector, and an ignition controlled power source, the vehicle having a B pillar, a passenger compartment and a trunk, the wiring system comprising:
   a fused electrical connection to the battery power connector;
   a fuse module electrically connected to the fused electrical connection, the fuse module comprising a plurality of fuses;
   at least one power distribution center, each at least one power distribution center having inputs electrically connected to one of the fuse module plurality of fuses and to the ignition controlled power source, the at least one power distribution center providing both constant power connections and ignition controlled power connections;
   a roof top lighting system electrical conductor electrically connected to another of the fuse module plurality of fuses and adapted to be electrically connected to a rooftop lighting system;
   a rear shelf mounted light assembly electrically connected to a power distribution center, the light assembly being activated by a vehicle on/off switch;
   grill light wiring electrically connected to a power distribution center;
   wig-wag wiring adapted to connect to high beam head lights, the wig-wag wiring including a plurality of connectors adapted to be connected to the high beam head lights; and
   a vehicle visibility enhancing light system electrically connected to a power distribution center, the vehicle visibility light system including a controller for activating one or more lights in an attention gathering manner.

27. The wiring system according to claim 26, wherein the adaptation of the roof top lighting system electrical conductor to be connected to a roof top lighting system includes a portion of the roof top lighting system electrical conductor being pre-positioned at a base of the B pillar.

28. The wiring system according to claim 26, wherein the number of power distribution centers is two, one power distribution center being located in the passenger compartment, the other power distribution center being located in the trunk.

29. A wiring system for use with a vehicle having a battery, the battery having a power connector and a ground connector, and an ignition controlled power source, the vehicle having a B pillar, a passenger compartment and a trunk, the wiring system comprising:
   a fused electrical connection to the battery power connector;
   a fuse module electrically connected to the fused electrical connection, the fuse module comprising a plurality of fuses;
   at least one power distribution center having inputs electrically connected to the fused electrical connection, via the fuse module, and to the ignition controlled power source, the at least one power distribution center providing both constant power connections and ignition controlled power connections, and including:
   a) at least one ignition power controlled relay connected to the power distribution center fused electrical connection input and to the power distribution center ignition controlled power source input;
   b) at least one fuse electrically connected to the power distribution center fused electrical connection input via an output of the at least one ignition power controlled relay and providing an ignition controlled power connection;
   c) at least one fuse directly connected to the power distribution center fused electrical connection input and providing a constant power connection; and
   d) at least one control relay; and
   a roof top lighting system electrical conductor electrically connected to the fused electrical connector, via the fuse module, and adapted to be electrically connected to a roof top lighting system,
   the roof top lighting system and the at least one power distribution center being electrically connected to a corresponding fuse of the fuse module plurality of fuses.

30. A wiring system for use with a vehicle having a battery, the battery having a power connector and a ground connector, and an ignition controlled power source, the vehicle having a B pillar, a passenger compartment and a trunk, the wiring system comprising:
   a fused electrical connection to the battery power connector;
   at least one power distribution center having inputs electrically connected to the fused electrical connection and to the ignition controlled power source, the at least one power distribution center includes at least one ignition power controlled relay electrically connected to the power distribution center fused electrical connection input and to the power distribution center ignition controlled power source input, the at least one power distribution center further includes at least one fuse electrically connected to the power distribution center fused electrical connection input via an output of the at least one ignition power controlled relay, the at least one power distribution center providing both constant power connections and ignition controlled power connections;

a rear shelf mounted light assembly electrically connected to a power distribution center, the light assembly being activated by a vehicle turn signal switch;

grill light wiring electrically connected to a power distribution center;

wig-wag wiring adapted to connect to high beam head lights, the wig-wag wiring including a plurality of connectors adapted to be connected to the high beam head lights;

speaker wiring adapted to be connected to a means for generating siren sounds and amplifying sounds to a speaker; and a vehicle visibility enhancing light assembly electrically including one or more lights and connected to a power distribution center, the vehicle visibility light assembly including a controller for activating the one or more lights in an attention gathering manner, the one or more lights including at least one strobe light.

31. The wiring system according to claim 30, further comprising:

a roof top lighting system electrical conductor electrically connected to the fused electrical connector and adapted to be electrically connected to a rooftop lighting system.

32. The wiring system according to claim 31, wherein the adaptation of the roof top lighting system electrical conductor to be connected to a roof top lighting system includes a portion of the roof top lighting system electrical conductor being pre-positioned at a base of the B pillar.

\* \* \* \* \*

UNITED STATES PATENT AND TRADEMARK OFFICE
CERTIFICATE OF CORRECTION

PATENT NO. : 6,674,182 B2
DATED : January 6, 2004
INVENTOR(S) : Lyman B. Maynard and Tom Forsythe It is certified that error appears in the above-identified patent and that said Letters Patent is hereby corrected as shown below:

<u>Title page,</u>
Item [63], Related U.S. Application Data: delete "Jan. 6, 2001" and insert -- Jan. 8, 2001 --

Signed and Sealed this

Seventh Day of September, 2004

JON W. DUDAS
*Director of the United States Patent and Trademark Office*

UNITED STATES PATENT AND TRADEMARK OFFICE
CERTIFICATE OF CORRECTION

PATENT NO. : 6,674,182 B2
DATED : January 6, 2004
INVENTOR(S) : Lyman B. Maynard et al.

It is certified that error appears in the above-identified patent and that said Letters Patent is hereby corrected as shown below:

<u>Title page,</u>
Item [73], Assignee, replace "Mannesmann VDO AG, Frankfurt am Main (DE)" with -- L&P Property Mangement Co., South Gate, CA --.
Item [74], *Attorney, Agent, or Firm*, replace "Cohen, Pontani, Lieberman & Pavane" with -- Hahn Loeser & Parks, LLP; Michael H. Minns --.

Signed and Sealed this

Twenty-sixth Day of October, 2004

JON W. DUDAS
*Director of the United States Patent and Trademark Office*